US011545142B2

(12) United States Patent
Zhao et al.

(10) Patent No.: US 11,545,142 B2
(45) Date of Patent: Jan. 3, 2023

(54) USING CONTEXT INFORMATION WITH END-TO-END MODELS FOR SPEECH RECOGNITION

(71) Applicant: Google LLC, Mountain View, CA (US)

(72) Inventors: Ding Zhao, Mountain View, CA (US); Bo Li, Fremont, CA (US); Ruoming Pang, New York, NY (US); Tara N. Sainath, Jersey City, NJ (US); David Rybach, Aachen (DE); Deepti Bhatia, Fremont, CA (US); Zelin Wu, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 90 days.

(21) Appl. No.: 16/827,937

(22) Filed: Mar. 24, 2020

(65) Prior Publication Data

US 2020/0357388 A1    Nov. 12, 2020

Related U.S. Application Data

(60) Provisional application No. 62/846,192, filed on May 10, 2019.

(51) Int. Cl.
*G10L 15/183*    (2013.01)
*G10L 15/16*    (2006.01)
(Continued)

(52) U.S. Cl.
CPC ............ *G10L 15/183* (2013.01); *G06K 9/623* (2013.01); *G06N 3/08* (2013.01); *G06N 20/00* (2019.01); *G10L 15/16* (2013.01)

(58) Field of Classification Search
CPC ....... G10L 15/183; G10L 15/16; G10L 15/26; G10L 15/08; G10L 2015/228;
(Continued)

(56) References Cited

U.S. PATENT DOCUMENTS 6,574,597 B1 *  6/2003  Mohri ................... G10L 15/183
704/251
7,308,404 B2 * 12/2007  Venkataraman ...... G10L 15/183
704/E15.009
(Continued)

FOREIGN PATENT DOCUMENTS

CA        2791277 A1 *  3/2013  ............. B60K 35/00
WO    WO-2017210256 A1 * 12/2017  ........... G10L 15/285

OTHER PUBLICATIONS

"Streaming End-to-end Speech Recognition for Mobile Devices" Yanzhang He et al, Nov. 15, 2018.
(Continued)

*Primary Examiner* — Andrew C Flanders
*Assistant Examiner* — Parker Mayfield
(74) *Attorney, Agent, or Firm* — Honigman LLP; Brett A. Krueger; Grant Griffith

(57) ABSTRACT

A method includes receiving audio data encoding an utterance, processing, using a speech recognition model, the audio data to generate speech recognition scores for speech elements, and determining context scores for the speech elements based on context data indicating a context for the utterance. The method also includes executing, using the speech recognition scores and the context scores, a beam search decoding process to determine one or more candidate transcriptions for the utterance. The method also includes selecting a transcription for the utterance from the one or more candidate transcriptions.

28 Claims, 6 Drawing Sheets

(51) Int. Cl.
*G06N 20/00* (2019.01)
*G06K 9/62* (2022.01)
*G06N 3/08* (2006.01)

(58) Field of Classification Search
CPC ........ G10L 2015/088; G10L 2015/085; G06N 20/00; G06N 3/08; G06K 9/623
See application file for complete search history.

(56) References Cited

U.S. PATENT DOCUMENTS

| | | | |
|---|---|---|---|
| 9,449,598 B1* | 9/2016 | Rastrow | G10L 15/193 |
| 9,934,777 B1* | 4/2018 | Joseph | G10L 15/063 |
| 2016/0171974 A1* | 6/2016 | Hannun | G10L 15/063 |
| | | | 704/232 |
| 2017/0162203 A1* | 6/2017 | Huang | G10L 15/285 |
| 2017/0278514 A1* | 9/2017 | Mathias | G10L 15/22 |
| 2018/0293221 A1* | 10/2018 | Finkelstein | G10L 17/10 |
| 2018/0330718 A1* | 11/2018 | Hori | G06N 7/005 |

OTHER PUBLICATIONS

International Search Report and Written Opinon for the related PCT Application PCT/US2020/024404 dated May 19, 2020.

* cited by examiner

USING CONTEXT INFORMATION WITH END-TO-END MODELS FOR SPEECH RECOGNITION

CROSS REFERENCE TO RELATED APPLICATIONS

This U.S. patent application claims priority under 35 U.S.C. § 119(e) to U.S. Provisional Application 62,846,192, filed on May 10, 2019. The disclosure of this prior application is considered part of the disclosure of this application and is hereby incorporated by reference in its entirety.

TECHNICAL FIELD

This disclosure relates to using context information with end-to-end models for speech recognition.

BACKGROUND

Recognizing the context of speech is challenging for automated speech recognition (ASR) systems given the wide variety of words that people may speak and the many variations in accents and pronunciation. In many cases, the types of words and phrases that a person speaks varies depending on the context the person finds himself or herself in.

Contextual automated speech recognition (ASR) involves biasing speech recognition towards a given context, such as towards a user's own playlist, contacts, or geographic place names. Context information usually includes a list of relevant phrases to be recognized, which often includes rare phrases or even foreign words which are seen infrequently in training. To perform contextual biasing, conventional ASR systems sometimes model contextual information in an independent contextual language model (LM), using an n-gram weighted finite state transducer (WFST), and compose the independent contextual LM with a baseline LM for on-the-fly (OTF) restoring.

Recently, end-to-end (E2E) models have shown great promise for ASR, exhibiting improved word error rates (WERs) and latency metrics as compared to conventional on-device models. These E2E models, which fold the acoustic model (AM), pronunciation model (PM), and LMs into a single network to directly learn speech-to-text mapping, have shown competitive results compared to conventional ASR systems which have a separate AM, PM, and LMs. Representative E2E models include word-based connectionist temporal classification (CTC) models, recurrent neural network transducer (RNN-T) models, and attention-based models such as Listen, Attend, and Spell (LAS).

Because E2E models maintain a limited number of recognition candidates during beam-search decoding, contextual ASR can be challenging for E2E models. It can be particularly challenging for E2E grapheme-only models and E2E wordpiece-only models to spell out-of-vocabulary (OOV) words, particularly those classes of words that are virtually unseen in training.

SUMMARY

Implementations herein are directed toward an automatic speech recognition (ASR) system applying a biasing technique that uses various types of contextual information to bias speech recognition towards words and phrases that are most likely relevant to a current context in which an utterance was spoken. When one of the contexts is detected, the ASR system uses the associated set of words to improve the recognition of those words. The biasing technique can be used with end-to-end models, such as neural network models that incorporate the functions of acoustic models, pronunciation models, and language models into a single unified model. Various techniques discussed herein can improve contextual biasing of end-to-end models and address the problems that arise in implementing biasing with end-to-end models.

Contextual biasing to a specific domain, such as a user's song names, application names, or contact names, can significantly improve the accuracy of an ASR system. Contextual biasing can be challenging using end-to-end models because these models often retain only a small list of candidates during beam search. Many end-to-end models also have relatively poor accuracy in recognizing proper nouns, which are the most common source of biasing phrases.

Incorporating contextual knowledge in end-to-end models can be challenging for a variety of reasons. First, because neural network models are trained with a joint acoustic, pronunciation, and language model, they are typically trained with far less text data than a traditional language model. While a traditional language model may be trained using text from any source, even when no corresponding audio data is available, end-to-end models are generally trained with paired text and corresponding audio data, which is less varied and more difficult to obtain than pure text. This results in the model being trained with many fewer examples of proper nouns and lower accuracy for proper nouns as a result. Many of the n-grams that are relevant to specific contexts are proper nouns, and without biasing, it is difficult for the models to predict these context-relevant n-grams. Second, for efficient decoding, end-to-end models generally must prune the search space for candidate transcriptions to a small number of candidates at each step of the beam search. As a result, in a traditional end-to-end model, this pruning process often causes rare words and phrases to be pruned early, and thus, be omitted from the set of candidate transcriptions.

Incorporating contextual knowledge into the process of decoding output of an end-to-end model can improve accuracy of speech recognition using the end-to-end model. Described in greater detail below, incorporating contextual information into the decoding process may involve selectively integrating contextual information and outputs (e.g., probability distributions over possible speech recognition hypothesis) from the model into a lattice. Determinations whether to use contextual information and what contextual information to use can be made based on a context in which speech was uttered or other factors.

Performing biasing at the sub-word unit level (e.g., for individual graphemes or wordpieces), rather than for words as a whole, can further improve contextual biasing with end-to-end models. This can provide a significant improvement to accuracy by biasing the initial graphemes or wordpiece units of target words, rather than simply biasing after a word is completed. With some end-to-end models, the decoding process performed by the model quickly removes uncommon words, such as proper nouns, from consideration (e.g., by pruning during beam search) after considering only the first few graphemes or wordpieces. With word-level biasing, this situation can cause words to be removed from consideration before the word is completed, so the biasing does not have a chance to occur. By contrast, biasing a word by boosting scores for the sub-word units that make up the word can increase the scores at the initial portion of the word, so that boost provided by the biasing retains the word as a candidate transcription. Moreover, applying contextual biasing early in the decoding process by adjusting speech recognition scores before beam pruning, as opposed to after beam pruning, can help ensure that target words are appropriate considered rather than being removed due to pruning before the biasing process has an opportunity to take effect.

To further improve overall recognition accuracy, the ASR system can also take into account prefix words and phrases when performing biasing. Certain words and phrases often precede statements that involve specific types of words. For example, when users provide commands to a device, the word "call" often occurs before the name of a person, and the word "play" often precedes the name of a media item, such as a song in the user's collection. The ASR system can use the detection of prefixes to improve recognition accuracy, for example, as the presence of a known prefix provides additional confidence that recognition should be biased to specific types of words. Additionally, in some implementations, biasing can be applied only when an appropriate prefix is detected, so that biasing does not interfere with or degrade the accuracy of general word recognition. As a result, high recognition accuracy can be maintained for general vocabulary of the model even as contextual biasing improves recognition accuracy for certain words and phrases that have their likelihoods boosted in a context-dependent manner.

Various techniques can also be used to improve modeling of proper nouns. Some of these techniques can leverage a large corpus of text-only data. For example, for training, the system can obtain or create a large number of proper noun text-only queries, and then synthesize corresponding speech. The system can leverage a large amount of unsupervised data indicating audio and corresponding text data, filtered to keep data with proper nouns. As another example, the system can create variants of or "fuzz" training data transcripts to create more proper noun examples.

One aspect of the disclosure provides a method for using contextual biasing to transcribe speech. The method includes receiving, at data processing hardware, audio data encoding an utterance, and processing, at the data processing hardware, using a speech recognition model, the audio data to generate speech recognition scores for speech elements. The method also includes determining, by the data processing hardware, context scores for the speech elements based on context data indicating a context for the utterance. The method further includes executing, by the data processing hardware, using the speech recognition scores and the context scores, a beam search decoding process to determine one or more candidate transcriptions for the utterance, and selecting, by the data processing hardware, a transcription for the utterance from the one or more candidate transcriptions.

Implementations of the disclosure may include one or more of the following optional features. In some implementations, during execution of the beam search decoding process, the context scores are configured to adjust a likelihood of the one or more candidate transcriptions before pruning any of the one or more candidate transcriptions from evaluation. In additional implementations, executing the beam search decoding process includes using the context scores to prune paths through a speech recognition lattice to determine the one or more candidate transcriptions for the utterance. In some examples, the method also includes identifying, by the data processing hardware, a particular context for the utterance based on the context data. In these examples, determining the context scores for the speech elements is based on the identified particular context. In these examples, determining the context scores for the speech elements may further include using a contextual finite-state transducer (FST) to determine the context scores for the speech elements, the contextual FST corresponding to the particular context.

In some implementations, the method further includes, prior to receiving the audio data encoding the utterance, generating, by the data processing hardware, a plurality of contextual FSTs each representing a different set of words or phrases in a personalized data collection of a user that spoke the utterance, and storing, by the data processing hardware, the plurality of contextual FSTs in memory hardware in communication with the data processing hardware. Here, the contextual FST in the plurality of contextual FSTs corresponds to a different particular context. In these implementations, the personalized data collection may include a contacts list for the user, and/or a media library for the user, and/or a list of applications installed on a user device associated with the user. In these implementations, the method may further include, for each of at least one contextual FST in the plurality of contextual FSTs, generating, by the data processing hardware, a corresponding prefix FST including a set of one or more prefixes each corresponding to the different particular context of the corresponding contextual FST, and storing, by the data processing hardware, the corresponding prefix FST generated for the at least one contextual FST in the plurality of contextual FSTs. In these implementations, the method may optionally include, determining, by the data processing hardware, that a preliminary transcription for the utterance included one of the one or more prefixes of the corresponding prefix FST, and selectively activating, by the data processing hardware, the contextual FST corresponding to the prefix FST that includes the one of the one or more prefixes included in the preliminary transcription. Here, determining the context scores for the speech elements is based on the selectively activated contextual FST.

In some examples, the data processing hardware resides on a user device associated with a user that spoke the utterance and executes the speech recognition model. In some implementations, the speech recognition model includes an end-to-end speech recognition model. For instance, the end-to-end speech recognition model may include a recurrent neural network-transducer (RNN-T).

In some examples, the method further includes determining, by the data processing hardware, that a preliminary transcription for the utterance includes a word that represents a prefix element corresponding to the context for the utterance. In these examples, determining the context scores for the speech elements is based on the determination that the preliminary transcription for the utterance includes the word that represents the prefix element corresponding to the context for the utterance. In additional examples, determining the context scores for the speech elements based on the context includes determining the context scores using a contextual FST that represents contextual terms using elements representing subword units. In these examples, the contextual FST may include a transition weight configured to bias each transition between the subword units of a contextual term, and backoff arcs having offsetting weights configured to undo the biasing effect of the transition weight. In some examples, the speech elements include wordpieces or graphemes.

Another aspect of the disclosure provides a system for using contextual biasing to transcribe speech. The system includes data processing hardware and memory hardware in communication with the data processing hardware. The memory hardware stores instructions that when executed by the data processing hardware cause the data processing hardware to perform operations that include receiving audio data encoding an utterance, and processing, using a speech recognition model, the audio data to generate speech recognition scores for speech elements. The operations also include determining context scores for the speech elements based on context data indicating a context for the utterance. The operations further include executing, using the speech recognition scores and the context scores, a beam search decoding process to determine one or more candidate transcriptions for the utterance, and selecting a transcription for the utterance from the one or more candidate transcriptions.

Implementations of the disclosure may include one or more of the following optional features. In some implementations, during execution of the beam search decoding process, the context scores are configured to adjust a likelihood of the one or more candidate transcriptions before pruning any of the one or more candidate transcriptions from evaluation. In additional implementations, executing the beam search decoding process includes using the context scores to prune paths through a speech recognition lattice to determine the one or more candidate transcriptions for the utterance. The operations may also include identifying a particular context for the utterance based on the context data, wherein determining the context scores for the speech elements is based on the identified particular context. Further, determining the context scores for the speech elements may include using a contextual finite-state transducer (FST) to determine the context scores for the speech elements, the contextual FST corresponding to the particular context.

In some examples, the operations further include, prior to receiving the audio data encoding the utterance, generating a plurality of contextual FSTs each representing a different set of words or phrases in a personalized data collection of a user that spoke the utterance, and storing the plurality of contextual FSTs in memory hardware in communication with the data processing hardware. Here, the contextual FST in the plurality of contextual FSTs corresponds to a different particular context. In these examples, the personalized data collection may include a contacts list for the user, and/or a media library for the user, and/or a list of applications installed on a user device associated with the user. In examples, the operations may further include, for each of at least one contextual FST in the plurality of contextual FSTs, generating a corresponding prefix FST including a set of one or more prefixes each corresponding to the different particular context of the corresponding contextual FST, and storing the corresponding prefix FST generated for the at least one contextual FST in the plurality of contextual FSTs. In these examples, the operations may further include, determining that a preliminary transcription for the utterance included one of the one or more prefixes of the corresponding prefix FST and selectively activating the contextual FST corresponding to the prefix FST that includes the one of the one or more prefixes included in the preliminary transcription. Here, determining the context scores for the speech elements is based on the selectively activated contextual FST.

In some implementations, the data processing hardware resides on a user device associated with a user that spoke the utterance and executes the speech recognition model. The speech recognition model may include an end-to-end speech recognition model. For instance, the end-to-end speech recognition model may include a recurrent neural network-transducer (RNN-T).

In some examples, the operations further include determining that a preliminary transcription for the utterance includes a word that represents a prefix element corresponding to the context for the utterance. In these examples, determining the context scores for the speech elements is based on the determination that the preliminary transcription for the utterance includes the word that represents the prefix element corresponding to the context for the utterance. In additional examples, determining the context scores for the speech elements based on the context includes determining the context scores using a contextual FST that represents contextual terms using elements representing subword units. In these examples, the contextual FST may include a transition weight configured to bias each transition between the subword units of a contextual term, and backoff arcs having offsetting weights configured to undo the biasing effect of the transition weight. In some examples, the speech elements include wordpieces or graphemes.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
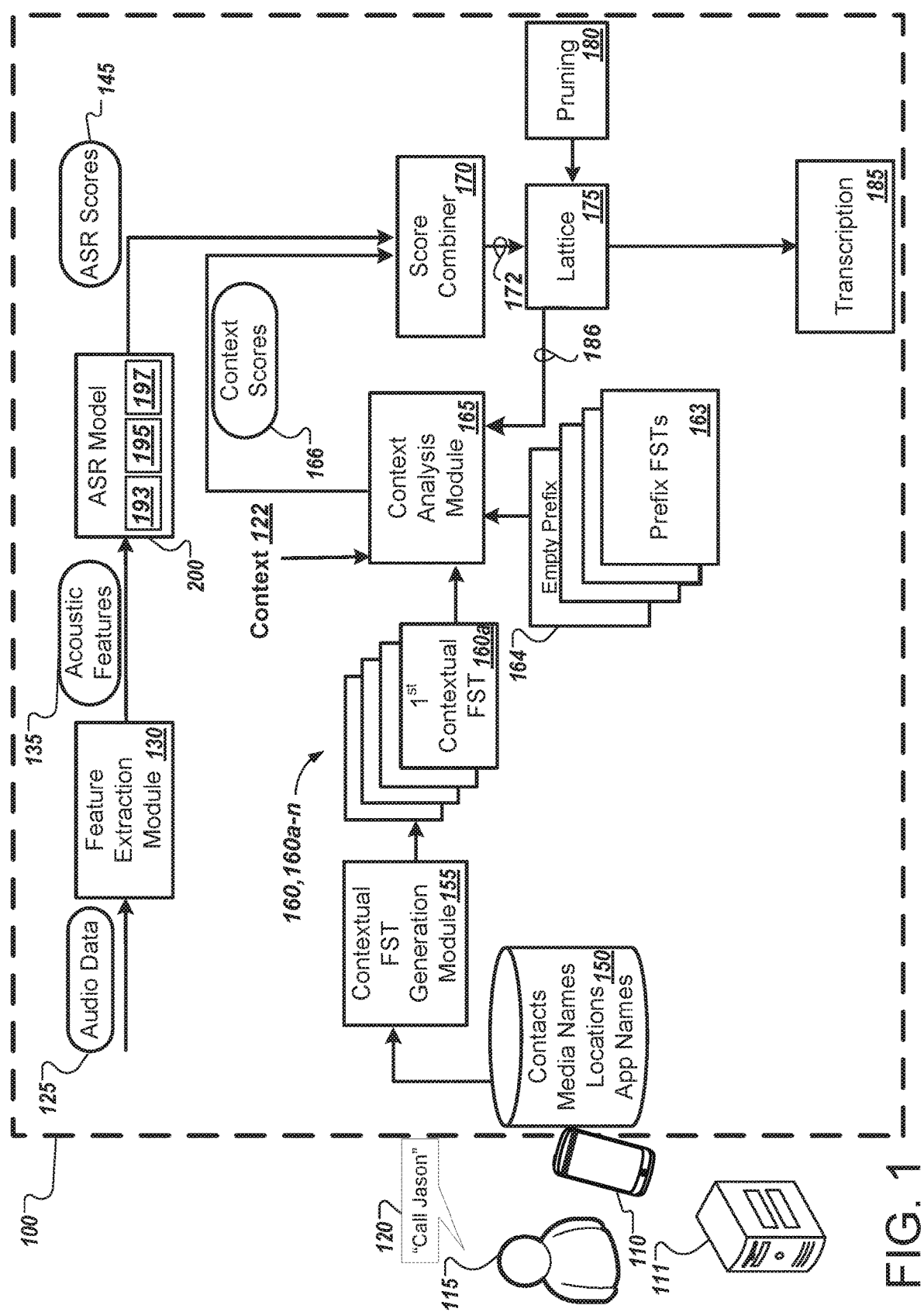
FIG. 1 is a schematic view of an example speech recognizer using contextual biasing to transcribe speech.

To provide high accuracy speech recognition, speech recognition systems can be configured to take into account the context in which speech occurs. The context may represent a particular domain or class of language, such as song names, application names, contact names, or locations, among others. For example, if the speech recognition system determines that a user is likely attempting to initiate a phone call, speech recognition quality may improve when the speech recognition system biases the recognition process toward names of contacts in the user's contact list.

Speech recognizers may be used in many different types of situations. For example, a speech recognizer may be adapted for use in a vehicle, by a mobile device without a display, by a mobile device with a display, by a digital assistant application running on a mobile phone, by a digital assistant application running on a computing device, such as, without limitation, a desktop computer, a laptop computer, a smart speaker, a smart appliance, a smart display, smart headphones, or other wearable device.

Speech recognizers may be used for many different purposes. For example, a speech recognizer may be used to request that a device plays a certain song or a music album by a certain artist. Speech recognizers may be used to call or text a contact, or to transcribe speech for input to an email, note, or calendar event. The various factors that indicate the situation in which an utterance occurs may be referred to as the context. Different contexts may have different sets of terms that are related and likely to be spoken by a user. In general, different context may be related to different words, topics, user actions, applications, and so on. As a result, depending on the context that the speech recognition system identifies, the speech recognition system can bias different sets of terms to better match the expected speech of the user. This can greatly improve the accuracy of recognizing proper names and other terms that are unlikely in speech generally, but may be much more likely to occur within specific contexts or situations.

In some implementations, an independently-trained contextual n-gram language model, represented as a weighted finite state transducer (FST), represents context information. The ASR system biases the recognition process towards the terms of a specific context by incorporating the contextual n-gram language model as another component that affects scoring of the elements of a speech lattice. As discussed below, the contextual biasing can adjust scores for elements of a word lattice or lattice of subword units (e.g., graphemes or phonemes). Thus, the contribution of the contextual biasing language model can be a factor in pruning decisions during beam search decoding, rather than simply being applied after pruning.

While end-to-end speech recognition models combine the functions of traditional acoustic, pronunciation, and language models into a single neural network, incorporating contextual information/knowledge into these end-to-end speech recognition models is challenging for a variety of reasons. For example, for efficient decoding, end-to-end models generally prune to a small number of candidates at each step of the beam search. Hence, rare words and phrases, such as proper nouns, are likely to fall off the beam. As described in greater detail below, by incorporating contextual biasing into the lattice before the pruning decision, the contextual biasing can give greater weight for uncommon terms that are more likely to be used in the current context, thereby keeping those candidates in the paths of the beam search decoding process so that they are not omitted prematurely.

The ASR system may create contextual FSTs to represent the terms relevant to each of a multitude of different contexts. These FSTs can be personalized for a user based on the information that is stored on or accessible by the user's device (e.g., the user's calendar, the user's contacts list, the user's media library, etc.). The ASR system can also incorporate prefix FSTs that represent collections of prefixes that signal the relevance of different contextual FSTs. For example, the prefixes "open," "start," and "close" may be prefixes indicating that the next term spoken may be an application name, so the detection of one of those prefixes may cause the speech recognition system to make the contextual FST for application names to become active. As another example, the prefix "play" may signal that the contextual FST for media items may be used, and the prefixes "call," "text," or "e-mail" may signal that the contextual FST for contact names should be used.

Performing biasing at the wordpiece, rather than at the grapheme level, can further improve contextual biasing with end-to-end models by more accurately discriminating among words and limiting the number of candidates that need to be maintained on a search beam. Applying contextual biasing before beam pruning may avoid eliminating relevant word pieces from the search beam prematurely.

FIG. 1 illustrates an example speech recognizer 100 that uses contextual biasing to transcribe speech. In some implementations, a user device 110, such as a mobile phone, tablet computer, smart speaker, smart display, smart headphones, smart appliance, laptop computer, wearable device, desktop computer, and so on, stores and executes the speech recognizer 100. In these implementations, the speech recognizer 100 is configured to run locally on the user device 110 without communication with or support from other devices, such as servers or other network-based resources. However, a remote server or other network-based resources in communication with the user device 110 may store and execute the speech recognizer 100 without departing from the scope of the present disclosure. In some configurations, functionality of the speech recognizer 100 split among the user device 110 and the remote server or the other network-based resources.

In the example shown, a user 115 speaks an utterance 120 that is detected by one or more microphones of the user device 110 and/or at least one microphone that is in communication with the user device 110. The user device 110 uses the speech recognizer 100 to determine a transcription 185 for the utterance 120, In the example, the user 115 speaks a command, for example, a request to a conversational digital assistant. Once the transcription 185 is determined, the user device 110 can interpret the transcription 185 and take an appropriate action in response, such as to perform the requested action, provide a query to a search engine, display the transcription, enter the transcription in a message field, and so on.

Before the user 115 speaks the utterance 120, the user device 110 takes steps to prepare for fast and accurate contextual biasing that will improve speech recognition accuracy. One of these steps is to obtain and process information associated with the user 115 and/or the user device 110 to determine which terms (e.g., words and/or phrases) are relevant to different contexts or topical domains. The user device 110 (e.g. memory hardware of the user device 110) includes a data store 150 of contextual information, such as a list of the user's contacts, names of items in the user's media library, names of nearby locations, and names of installed applications. The data store 150, or portions thereof, may also reside on a remote storage device, e.g., the remote server 101 of a cloud storage environment. The speech recognizer 100 can communicate with software of the user device 110 to obtain lists of these terms. The information in these different contextual data sets will change from time to time, such as when the user adds or deletes contacts, when the user's media library changes, when the user changes location, and so on. The speech recognizer can periodically request updates to the lists of data in order to refresh the contextual information it uses. This may include obtaining information over a network, for example, from a server for a map service, a server hosting information about a user's media library, and so on.

The speech recognizer 100 further includes a contextual. FST generation module 155 configured to use the contextual information from the data store 150 for generating/updating contextual FSTs 160, 160a-n. The contextual FST generation module 155 can determine a different respective weighted contextual FST 160 for each context that the system is configured to detect. The contextual FST generation module 155 accesses data from the data store 150 to generate each contextual FST 160. For example, a first contextual FST 160*a* can represent names from the user's 115 contacts list, a second contextual FST 160*b* can represent names of items in the user's 115 media library, a third contextual FST 160*c* can represent location names for locations near the user's 115 current location, and so on. The contextual FST generation module 155 can update the contextual FSTs 160 periodically on an ongoing basis, for example, at regular intervals, in response to detecting changes in the data in the data store 150, etc.

Because each contextual FST 160 corresponds to a context that is different than the contexts associated with the other contextual FSTs 160, not all contextual FSTs 160 will be appropriate for use at the same time. As used herein, the context that each contextual FST 160 corresponds to may be referred to as a context domain. Various techniques can be used to selectively activate the relevant contextual FSTs 160 matching a current context while not activating others that do not match the current context. One way to tailor the contextual biasing to the current context is to use prefix FSTs 163 each representing the occurrence of different sets of prefixes that correspond to a different respective context. For example, the occurrence of the prefix "call" can indicate that a contact name is likely the next word, and so the prefix FST 163 for this prefix can cause the speech recognizer 100 to enable the contact names contextual FST 160. As another example, the occurrence of the prefix "play" can indicate that a media item name is likely the next word, and so the prefix FST 163 for this prefix can cause the speech recognizer to enable media item names contextual FST 160. Each contextual FST 160 can optionally have a corresponding prefix FST 163 representing a set of one or more prefixes that have been determined, through analysis of user input logs, to indicate that the terms in the contextual FST 160 are likely. In some implementations, the prefix FSTs include an empty prefix option 164, which allows the use of contextual biasing without the earlier utterance of a prefix first.

In some implementations, the contextual FSTs 160 and the prefix FSTs 163 are composed into a single contextual FST for use during the speech recognition process. Alternatively, a module such as a context analysis module 165 can use various factors to select which contextual FSTs 160 apply for different contexts.

The speech recognizer 100 includes various elements to process acoustic information, including a feature extraction module 130 and an end-to-end speech recognition model 200. When the utterance 120 is spoken, the one or more microphones of the user device 110 generate audio data 125 representing the acoustic characteristics of the utterance 120. A feature extraction module 130 receives the audio data 125 and that generates acoustic features 135 (e.g., log-mel features) from the audio data 125. For example, the output of the module 130 can be an acoustic feature vector for each window or frame (e.g., segment) of the audio data 125, where the acoustic feature vector includes values indicating features such as the energy level at different frequency bands.

The speech recognition model 200 receives the acoustic features 135 as input and calculates, as output, speech recognition scores 145 representing the likelihood that different speech elements have occurred. The speech elements may include wordpieces or graphemes. For example, the speech recognition model 200 may output a vector of scores representing a probability distribution over a set of output targets, e.g. a set of different graphemes or wordpieces that can potentially be output. Thus, an output vector of speech recognition scores 145 from the speech recognition model 200 can indicate the likelihood that various graphemes or wordpieces accurately describe the speech in a portion of the audio data 125. As the speech recognition model 200 includes an end-to-end model combining the functionality of a pronunciation model, an acoustic model, and a language model in a single model (e.g., neural network), the speech recognition model 200 may receive acoustic features 135, or even raw audio data 125, and provide output scores indicating likelihoods of orthographic features (e.g., graphemes, wordpieces, or words) in response.

When recognizing the utterance 120, the speech recognizer 100 also processes data indicating the context of the utterance 120 to determine context scores 166. The speech recognizer 100 can include a context analysis module 165 that receives various types of information about a context 122 of the utterance 120. For example, the context analysis module 165 may receive information about a location of the device 110, a task being performed by the user 115 using the device 110, an application that is open or active on the device 110, and so on. The context analysis module 165 can also receive data indicating the most recent speech recognition decisions, such as most recently recognized grapheme, wordpiece, word, or phrase, including in partial or preliminary transcriptions 186 during a beam search process. Using any or all of this context information, the context analysis module 165 can select from among the contextual FSTs 160 or apply different weights to the contextual FSTs 160. The contextual FSTs 160 (e.g., one or more contextual FSTs 160 selected to be applicable to the current context of the utterance 120) are then used to generate context scores 166 that can bias the recognition process toward the terms and phrases identified in the data storage 150. As discussed above, the contextual FSTs 160 and prefix FSTs 163 and 164 were previously generated and stored, so they are available before the utterance 120 is spoken.

The context analysis module 165 can limit which contextual FSTs 160 are used to bias a given utterance 120 based on the presence of a predetermined prefix or keyword detected in the preliminary transcription 186. Although the context analysis module 165 may use any appropriate method to compare recognized speech with prefixes or other keywords, the process may be done efficiently using the prefix FSTs 163 and 164. The weights and transitions of the prefix FSTs 163 and 164 can indicate, as the speech units of a known prefix are recognized (e.g., in the preliminary transcription 186), which of the contextual FSTs 160 are most likely relevant and how their biasing influence should be weighted. The prefix FSTs 163 can be concatenated, or linked to, the contextual FSTs 160 so that the prefix FST can directly lead to biasing using one or more of the contextual FSTs 160.

As discussed above, the prefix FSTs 163 are used to activate contextual FSTs and corresponding biasing phrases only when proceeded by a commonly used set of prefixes. When a prefix is spoken, there is a higher confidence that certain phrases will be spoken. By linking prefix FSTs 163 to contextual FSTs 160, the context analysis module 165 increases the biasing weight to improve overall biasing. For example, if the speaks the word "call," the prefix FST 163 will cause the context analysis module 165 to enable the contextual FST corresponding to contacts, and so recognition will be biased toward contact names. Thus, the names of contacts will be more likely to be included in a transcription 185.

In cases where biasing is active for many categories, such as for media names, contacts, and application names, the recognition quality can degrade in some circumstances due to excessive biasing distracting from standard word usage. The prefix FSTs 163 have an empty prefix option 164, which allows contextual FSTs 160 to be used without occurrence of a predetermined prefix, but the empty prefix option 164 applies a smaller biasing weight when no prefix is spoken, to prevent over-biasing.

The context scores 166 based on the context information 122, 186 and the speech recognition scores 145 based on acoustic information 135 are used together to determine a transcription 185 for the utterance 120. In particular, the context scores 166 bias the recognition toward terms that are more relevant for the particular user 115 in the current context than for speech recognition generally. In some implementations, a score combiner 170 combines the speech recognition scores 145 with the context scores 166 to produce combined scores 172 used in a speech lattice 175. Significantly, the biasing influence of the context scores 166 is applied to the speech lattice 175 before pruning of the lattice 175 and before beam pruning in beam search. As a result, due to the influence of the context scores 166, relevant terms that might otherwise have been pruned are maintained through the beam search process and related pruning. The "beam search process" may be interchangeably referred to as a "beam search decoding process".

The speech recognizer 100 executes a beam search process to evaluate potential paths through the speech lattice 175 and determine the transcription 185. Each path through the lattice 175 can represent a different candidate transcription. It is generally not efficient or even possible to evaluate all possible word sequences, each associated with a respective candidate transcription. Thus, after the context scores 166 and ASR scores 145 are calculated and combined as combined scores 172, a beam pruning process 180 guides the search to the most promising word paths. Beam pruning 180 can reduce the range of the lattice 175 that is searched for probable words or word pieces. As the probability of each wordpiece is calculated, unlikely search paths are pruned, until only the most probable path remains.

The output of the beam search process is the transcription 185 of the user's utterance 120. Once the transcription 185 is determined, the transcription 185 can be used in any of various ways, e.g., displayed to the user 115, entered into a text field, sent as a query to a search engine or request to a digital conversational assistant, interpreted as a voice command, and so on. For example, the user device 110 uses the transcription 185 to identify an action for the user device 110 to perform, such as writing a text message or email, making a phone call, or playing a song. For example, if the transcription is "Call Jason," the user device 110 may initiate a telephone call to the contact named Jason and respond with a confirmation to the user 115, such as a synthesized utterance such as "Calling Jason now."

Figure 2:
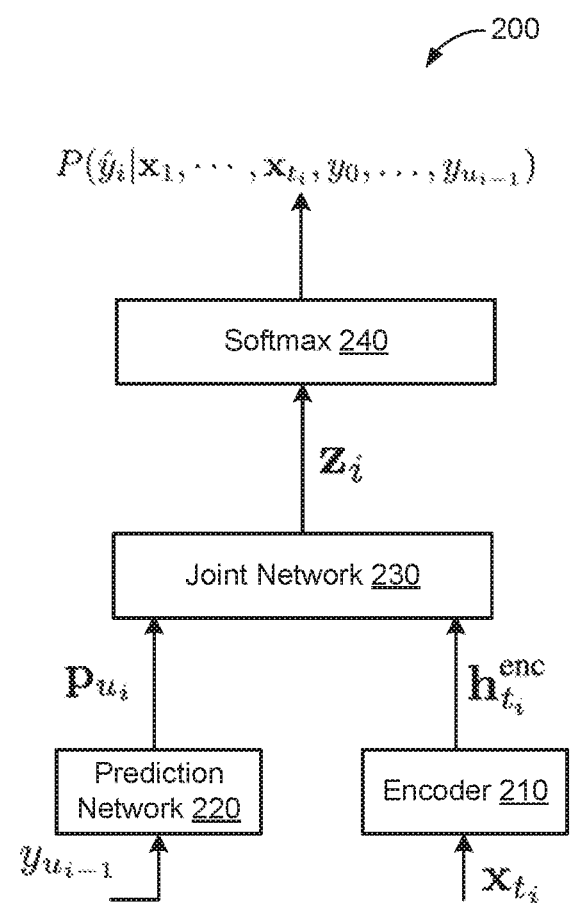
FIG. 2 is a schematic view of an example end-to-end, recurrent neural network-transducer (RNN-T) speech recognition model.

With reference to FIG. 2, the speech recognition model 200 may include an E2E, RNN-T model 200 which adheres to latency constrains associated with interactive applications. The RNN-T model 200 provides a small computational footprint and utilizes less memory requirements than conventional ASR architectures, making the RNN-T model architecture suitable for performing speech recognition entirely on the user device 102 (e.g., no communication with a remote server is required). The RNN-T model 200 includes an encoder network 210, a prediction network 220, and a joint network 230. The encoder network 210, which is roughly analogous to an acoustic model (AM) in a traditional ASR system, includes a recurrent network of stacked Long Short-Term Memory (LSTM) layers. For instance the encoder reads a sequence of d-dimensional feature vectors (e.g., acoustic frames 110 (FIG. 1)) $x=x_1, x_2, \ldots, x_T$), where $x_t \in \mathbb{R}^d$, and produces at each time step a higher-order feature representation. This higher-order feature representation is denoted as $h_1^{enc}, \ldots, h_T^{enc}$.

Similarly, the prediction network 220 is also an LSTM network, which, like a language model (LM), processes the sequence of non-blank symbols output by a final Softmax layer 240 so far, $y_0, \ldots, y_{ui-1}$, into a dense representation $D_r$. Finally, with the RNN-T model architecture, the representations produced by the encoder and prediction networks 210, 220 are combined by the joint network 230. The joint network then predicts $P(y_i|x_1, \ldots, x_{t_i}, y_0, \ldots, y_{u_{i-1}})$, which is a distribution over the next output symbol. Stated differently, the joint network 230 generates, at each output step (e.g., time step), a probability distribution over possible speech recognition hypotheses. Here, the "possible speech recognition hypotheses" correspond to a set of output labels each representing a symbol/character in a specified natural language. Accordingly, the joint network 230 may output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. The output distribution of the joint network 230 can include a posterior probability value for each of the different output labels. Thus, if there are 100 different output labels representing different graphemes or other symbols, the output $y_i$ of the joint network 230 can include 100 different probability values, one for each output label. The probability distribution can then be used to select and assign scores to candidate orthgraphic elements (e.g., graphemes, wordpieces, and/or words) in a beam search process (e.g., by the Softmax layer 240) for determining the intermediate transcription 115.

The Softmax layer 240 may employ any technique to select the output label/symbol with the highest probability in the distribution as the next output symbol predicted by the model 200 at the corresponding output step. In this manner, the RNN-T model 200 does not make a conditional independence assumption, rather the prediction of each symbol is conditioned not only on the acoustics but also on the sequence of labels output so far. The RNN-T model 200 does assume an output symbol is independent of future acoustic frames 110, which allows the RNN-T model to be employed in a streaming fashion.

In some examples, the encoder network 210 of the RNN-T model 200 includes a time reduction layer, followed by eight 2,000-dimensional LSTM layers, each followed by a 600-dimensional projection layer. The prediction network 220 may have two 2,048-dimensional LSTM layers, each of which is also followed by 640-dimensional projection layer. Finally, the joint network 230 may also have 640 hidden units, followed by a 4,096 wordpiece softmax output. The decoder is two LSTM layers with 2,000 hidden units and a 600-dimensional projection per layer. The encoder and decoder are fed to a joint-network that has 600 hidden units. The joint network is fed to the softmax layer, with either 96 units (for grapheme experiments) or 4,096 units (for wordpieces). All RNN-T models are trained in TensorFlow on 8×8 Tensor Processing Units (TPU) slices with a batch size of 4,096. During inference, each utterance is associated with a set of biasing phrases used to construct a contextual FST 160. Each arc in the biasing FST 160 has the same weight, as shown below with reference FIG. 4. This weight is tuned independently for each category (songs, contacts, etc.), to optimize performance on the above test sets.

In general, ASR models, such as the speech recognition model 200 can be trained using various methods, and the process may use large amounts of training data. Referring back to FIG. 1, the speech recognition model 200 (e.g., RNN-T) may train on training data that includes unsupervised data 193, supervised data 197, and/or synthetic data 195.

To improve the recognition of proper nouns, the speech recognition model 200 may be trained with a large amount of text data to provide more examples of nouns, thus increasing the variety of proper nouns to which the model is exposed. Unsupervised data 193 can be collected by mining utterances from voice search traffic. These utterances are then decoded by an ASR model, and only utterances with a high confidence are used for further training. To ensure that training is not dominated by the large amount of unsupervised data 193, during each step of training, the unsupervised data 193 is combined with supervised data 194 that has been verified or validated to be accurately transcribed. For instance, during each step, a training batch may be filled with supervised data 197 80% of the time, and unsupervised data 193 20% of the time, as this was found empirically to give the best performance. To emphasize the recognition of proper nouns during training, a proper noun tagger process can be run to filter the automatically generated transcriptions in the unsupervised data 193. In some implementations, only example utterances tagged as including a proper noun are used in training. Specifically, the proper noun tagger may run on each utterance such that for each proper noun, the phonetic representation of the proper noun is produced. For example, "Caitlin" is represented by the phonemes k eI t1 @n. Next, alternative words in the lexicon with the same phoneme sequence are looked at, for example, "Kaitlyn". Given the ground truth and alternative words, one of these words is randomly sampled during training. This gives the model more proper nouns during training. If the model 200 can spell more names during training, it will be more confident to spell these names when a contextual FST 160 is used during decoding, and words will not fall off the beam.

In some implementations, synthetic training datasets 195 can be created by generating sentences with a variety of proper nouns and then synthesizing corresponding audio data. This technique can greatly expand the number of audio-text pairs that can be used as training examples. In some implementations, the generated text and synthesized audio are determined for specific domains or categories. For example, category-specific prefixes and proper nouns can be combined to generate the example text. Text-to-speech techniques can then be used to generate synthesized speech of the generated text. In this manner, training data sets can be created with many utterances for each category. For example, artificial examples can be generated to represent communications such as text messages, mails, and the like. Similarly, in another category, examples can be generated to represent media requests. In another category, examples can be generated to simulate commands, actions, or requests for applications. Once the synthetic data 195 is generated, a combination of supervised data 197 and synthetic data 195 can be used for training, thus providing the core examples from the supervised data set and using the synthetic examples to further improve the model's handling of proper nouns and likely language from specific domains or categories. A room simulator may add noises to at least some of the utterances in one or both of the synthetic and supervised data 195, 197. During training, During training, each batch may be filled with supervised data 197 90% of the time and synthetic data 195 10% of the time.

Figure 3:
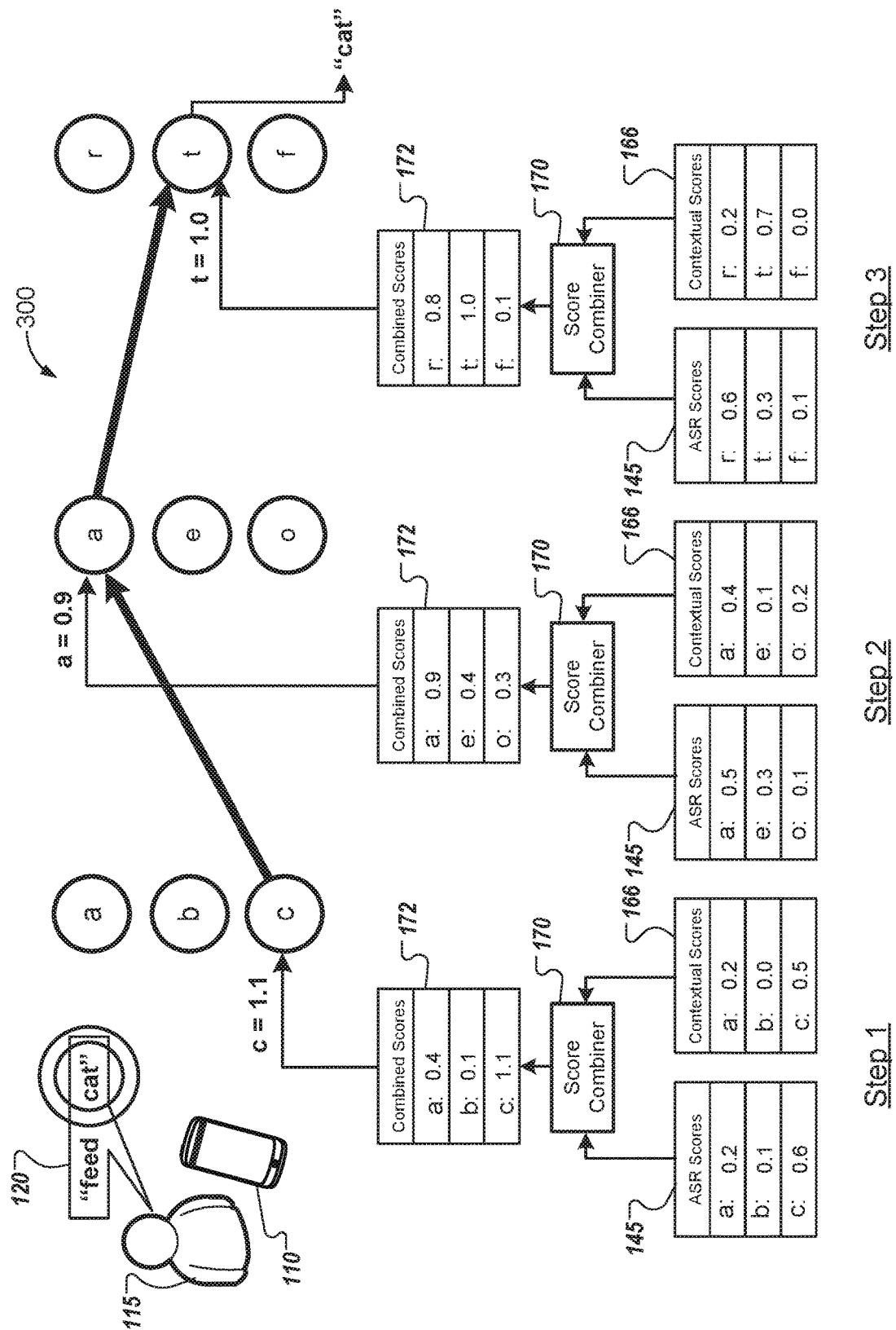
FIG. 3 is a diagram of the speech recognizer of FIG. 1 executing a beam pruning process on a lattice based on the speech recognition scores and context scores.

FIG. 3 shows a diagram 300 of the speech recognizer 100 executing the beam pruning process (e.g., pruning 180 of FIG. 1) on the lattice 175 output by the score to combiner 170 (FIG. 1) based on the speech recognition scores 145 (FIG. 1) and the context scores 166 (FIG. 1). In the example shown, the user 115 launching an application on the user device 110 that can control household equipment, including an automatic pet feeder. The launching of the application causes the contextual FST generation module 155 to generate one or more contextual FSTs 160 to bias words associated with household equipment such as the pet feeder. The user 115 speaks the utterance 120 including the words "feed cat" into the one or more microphones of the user device 110, In some examples, this utterance 120 invokes the user device 110 to launch the application for controlling household equipment. In other examples, the user 115 may speak another voice command to launch the application prior to speaking the utterance 120. In additional examples, the user 110 may speak a hotword to wake the user device 110 from a sleep state so that the user device 110 can process the utterance 120.

In some examples, the context analysis module 165 (FIG. 1) recognizes (e.g., in a preliminary transcription 186) the occurrence of the prefix "feed" as a commonly used prefix for a home automation category/context, and thereby biases words that are likely to follow "feed", such as "fish", "dog", and "cat". That is the corresponding prefix FST 163 that includes the prefix "feed" may cause the speech recognizer 100 to enable the contextual FST 160 associated with the home automation category/context. Accordingly, the context analysis module 165 references the contextual FSTs 160 and the prefix FSTs 163 to calculate the context scores 166, while at the same time, the speech recognition model 200 evaluates the audio features 135 to calculate the speech recognition scores 145 corresponding prefix FST 163.

Steps one (1) through three (3) depict successive output steps the speech recognizer 100 performs in recognizing different parts/portions of the audio features 135 for the word "cat", which follows the word "feed" in the corresponding utterance 120. As set forth in the remarks above, the occurrence of the word "feed" in the preliminary transcription 186 recognized by the context analysis module 165 as a prefix for the prefix FST 163 corresponding to the home automation contextual FST 160, causes the context analysis module 165 to generate context scores 166 for use in biasing the different grapheme decisions made in Steps 1-3.

In step 1, the score combiner 170 combines the ASR scores 145 (interchangeably referred to as "speech recognition scores") and the context scores 166 to calculate combined scores 172. Based on the combined scores 172, the grapheme "c" is identified as most likely, with a combined score 172 of 1.1. The ASR scores 145 and context scores 166 are recalculated at each step in the pruning process.

In step 2, the score combiner 170 combines the ASR scores 145 (interchangeably referred to as "speech recognition scores") and the context scores 166 for each of the output labels in the output distribution of the current step to calculate combined scores 172. Thus, in step 2, the grapheme "a" is identified as most likely, with a combined score 172 of 0.9.

In step 3, although the highest ASR scores 145 of 0.6 is for the grapheme "r", which would result in the pruning process omitting the grapheme "t" to incorrectly output the word "car" in the resulting transcription 185 the context score 166 of 0.8 shows a high likelihood for the grapheme "t". Accordingly, although the ASR score 145 of 0.3 for the grapheme "t" is not the highest ASR score 145 in the lattice 175 in step 3, the pruning process now identifies the grapheme "t" as the most likely output label in the lattice 175 in step 3, with a combined score 172 of 1.0. Thus, the pruning process may now correctly output the candidate word "cat" following the word "feed" in the resulting transcription 185. In this example, if the speech recognizer 100 did not consider the context scores 166 until after beam pruning 180, the beam pruning 180 would have pruned the correct candidate word "cat" off the beam prematurely without the opportunity to apply the context scores. Thus, the current context 122 of home automation derived from the open/launched application on the user device 115 and the recognition of the prefix "feed" in the preliminary transcription 186 cooperatively cause the speech recognizer 100 to calculate a context score 166 for the grapheme "t" that his higher than a context score 166 for the grapheme "r" after the speech recognition model 200 identifies the probable graphemes "c" and "a". Thus, the speech recognizer 100 is able to improve accuracy of the transcription 185 by generating context scores 166 and combining the context scores 166 with the ASR scores 145 output from the speech recognition model 200 before applying beam pruning 180 on candidate graphemes or wordpieces in the lattice 175. When the speech recognition model 200 of the speech recognizer 100 includes the RNN-T, the speech recognizer 100 may output the transcription 185 in a streaming fashion such that graphemes are individually output at each output step. In some examples, the speech recognizer 100 may wait to output wordpieces containing multiple graphemes or whole words in the transcription 180.

In some implementations, neural network contextual biasing applies the context scores 166 only at word boundaries. This approach may not be effective when the list of contextual phrases contains many proper nouns such as song names or contacts. Because neural network models predict subword units such as graphemes and wordpieces during the beam search, applying context scores at word boundaries will not work if the words to be biased are not present in the beam.

Figure 4:
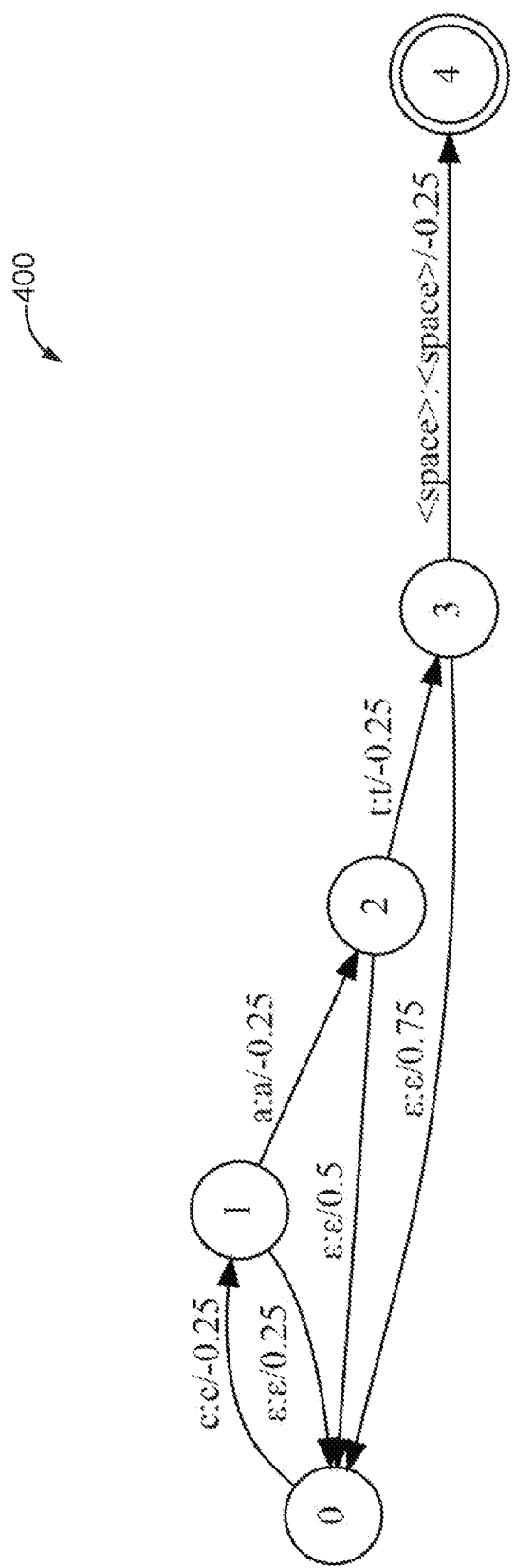
FIG. 4 is a schematic view depicting a technique for on-the-fly rescoring of context bias phrases.

FIG. 4 is a schematic view 400 depicting an on-the-fly (OTF) rescoring technique that pushes weights to each subword unit of a word. Specifically, FIG. 4 shows a subword FST having backoff arcs, wherein the backoff arcs correspond to negative weights for providing a subtractive cost to avoid artificially giving weight to prefixes which are boosted early on but do not match the entire phrase. That is, the subword FST contains backoff arcs that negate the weights that have been added before reaching the current state. By pushing the weights to each subword unit of the word, the OTF rescoring technique of FIG. 4 aims to help keep the word on the beam. Accordingly, biasing per subword unit is more effective than biasing at the end of each word, since biasing per subword unit reduces the odds of pruning biasing candidates prematurely from the beam.

Generally, biasing graphemes floods the beam with unnecessary words that have a partial grapheme match with the contextual FST 160. For instance, in the example shown in FIG. 4, when the biasing word is "cat", the contextual FST generation module 155 will generate the corresponding contextual FST 160 such that the graphemes 'c', 'a', and 't' are biased. First, the grapheme 'c' is biased, and thus "cat" and "car" may be brought on the beam. However, if bias is applied at the wordpiece level, there is a sparser match of relevant subwords, and therefore more relevant words come to the beam. Following the previous example, if the wordpiece to bias is "cat", then "car" will not come to the beam. Switching from grapheme to wordpiece biasing, such that biasing is performed at longer units, helps to keep more relevant candidates on the beam, improving performance.

In general, contextual biasing to a specific domain, such as a user's song names, app names and contact names, is an important component of production-level automatic speech recognition (ASR) systems. Contextual biasing is particularly challenging in end-to-end models because these models typically keep a small list of candidates during beam search, and also do poorly on proper nouns, which is the main source of biasing phrases. This discussion presents various algorithmic and proper noun improvements to shallow-fusion-based biasing for end-to-end models. Across a variety of tasks, the proposed approach obtains similar performance to a state-of-the-art conventional model.

As previously mentioned, the combining of the AM, PM, and LM by end-to-end speech recognition models into a single neural network make the ability to incorporate contextual knowledge challenging for a variety of reasons. First, because end-to-end models are trained with a joint AM, PM, and LM, they are trained with far less text data compared to a conventional LM, and thus make more errors in proper nouns compared to conventional models. Because contextual n-grams are often proper nouns ("call Jason", "text Jane"), it is difficult for the models to predict these n-grams. Second, for efficient decoding end-to-end models must prune to a small number of candidates (~4-10) at each step of the beam search. Hence rare words and phrases, as is the case with contextual n-grams, are likely to fall off the beam.

Conventional techniques of shallow fusion that incorporate an independent contextual n-gram LM into the framework of the end-to-end speech recognition model still suffer from proper nouns falling off beams since biasing occurs at the end of a word (rather than the grapheme/wordpiece units the end-to-end model predicts) and after the beam has been pruned at each step. It is often more effective to perform biasing within the end-to-end model, keeping with the theme of all-neural optimization. However, one of the concerns with all-neural biasing is that word error rate (WER) degrades when scaling up to a large number of n-grains. Another concern is that because contextual biasing may always be active, even when not appropriate, and it is preferred that performances do not degrade on utterances that are not intended be biased, which is referred to as "anti-context".

Implementations discussed above address early pruning of contextual n-grams by performing biasing at the sub-word unit level (grapheme, wordpiece) rather than the word-level, applying the contextual FST 160 before beam pruning rather than after, incorporating a prefix FST 163 having a common set of prefixes (e.g., "call", "text") to help tremendously with anti-context, and leveraging a larger corpus of text-only data to improve modeling of proper nouns. Specifically, the modeling of proper nouns includes: (1) obtaining synthetic training datasets 195 by creating a large number of proper noun text-only queries, and synthesizing corresponding speech; (2) leveraging a large amount of unsupervised audio-text data (e.g., unsupervised training data 193), filtered to keep data with proper nouns; and (3) fuzzing supervised training data 197 transcripts to create more proper nouns. Results are reported across four different contextual test sets. Proposed changes to the FST construction lead to significant improvements in shallow-fusion based biasing. In addition, with better proper noun modeling by training with a large amount of unsupervised data, performance further improves. Overall, the end-to-end biasing solution outperforms a conventional embedded model across all sets except songs between 20-40% relative.

Traditional ASR systems (with separate AM, PM, and LMs), perform contextual biasing by representing a list of biasing phrases as an n-gram finite state transducer (FST) and composing the LM with this contextual FST during decoding. This helps to bias the recognition result towards the n-grams in the contextual FST, and reduces WER in certain scenarios. A similar technique is used to build an n-gram FST, and then incorporate the n-gram FST into the end-to-end decoding framework.

Given a set of acoustics observations $x=(x_1, \ldots, x_K)$ end-to-end models provide posterior probabilities for a set of subword units $y=(y_1, \ldots, y_L)$ given these observations, that is P(y|x). Shallow fusion interpolates the score from the end-to-end model with an external contextual LM during beam-search decoding, given by Equation (1).

$$y^* = \underset{y}{\operatorname{argmax}} \log P(y \mid x) + \lambda \log P_C(y) \qquad \text{Equation (1)}$$

Here. $P_C(y)$ is the score from the contextual LM and $\lambda$ is a tunable hyperparameter controlling how much the contextual LM influences the overall model score during beam search.

To construct the contextual LM for end-to-end models, a set of word-level biasing phrases are known ahead of time, and compiled into an n-gram weighted finite state transducer (WFST). This word-level WFST, G, is then left-composed with a "speller" FST, S, which transduces a sequence of graphemes/wordpieces into the corresponding word. The subword FST is obtained as the contextual LM, min(det (SoG)).

Biasing of end-to-end models with shallow fusion was first explored using a method in which the contextual LM was applied only at word boundaries, similar to biasing with traditional systems. This approach was not found to be effective when the list of contextual phrases contains many proper nouns (e.g., song names or contacts). Because end-to-end models predict sub-word unit labels y (graphemes, wordpieces) during the beam search, applying a contextual LM at word boundaries will not work if the words to be biased are not present in the beam. To address this issue, the weights of the subword FST are pushed to each subword unit. To make the subword FST deterministic, the same weight is used for every subword unit. To avoid artificially giving weight to the candidates that match the prefixes but not the entire phrase, failure arcs are included, as shown in FIG. 3. Unlike the n-gram FST, whose failure arcs do not carry weights, the subword FST contains failure arcs that negates the weights that have been added before reaching the current state. Biasing per subword unit was found to be more effective than biasing at the end of each word, as it reduced the chance of biasing candidates being pruned early from the beam. However, the idea was explored only using grapheme subword units. In addition, the results with "anti-context" were not explored, to ensure that phrases that are not intended to be biased are not overbiased. Additional improvements to shallow-fusion end-to-end biasing to address these concerns are described below.

Bias phrases can be activated selectively, for example, only if a biasing phrase is proceeded by a commonly used set of prefixes. For example, a contact request typically has the prefix "call", "text", or "message", while a song request often uses the prefix "play", This technique is used by conventional models and has two main advantages. First, in cases where biasing is active for each request like for songs, contacts and apps, the recognition quality degrades for utterances that do not contain any biasing phrase, a problem known as anti-context. Constraining biasing to only after seeing the prefixes helps to avoid such over-biasing. The second advantage is that after seeing the prefix, the confidence is higher for biasing towards certain phrases, which allows increasing the biasing weight and improving overall biasing performance.

In one example, contextual FSTs 160 may be constructed with lists of prefixes such that all prefixes appearing more than a threshold number of times (e.g., 50-times) that precede the corresponding biasing phrases are extracted for use in corresponding prefix FSTs 163 each concatenated with a corresponding contextual FST 160. While an empty prefix option is allowed to skip a prefix, this would cancel the intended constraining effect of the activation prefix. Accordingly, a smaller biasing weight may be used for the empty prefix.

Table 1 shows proposed algorithmic improvements where experiments E0 and E1 depict grapheme and WPM baselines, respectively, without biasing, experiment E2 depcicts grapheme biasing results without any proposed improvements, and experiment E3 uses a substractive cost to prevent the model from keeping bad candidates on the beam for context sets of related to Songs, Contacts-real, Contacts TTS, and Apps.

Switching from grapheme to WPM biasing (E4), such that biasing occurs at longer units, helps to keep more relevant candidates on the beam, and also improves performance. Finally, applying the biasing FST before pruning, denoted as early biasing below, helps to ensure that good candidates remain on the beam early on, and leads to additional improvements (E5). Overall, the best shallow fusion setup is to bias at the WPM level with subtractive cost and early biasing.

TABLE 1

Shallow Fusion Results.

| Exp ID | Model | Songs | Contacts-Real | Contacts-TTS | Apps |
|---|---|---|---|---|---|
| E0 | Grapheme, No Biasing | 19.6 | 18.6 | 28.3 | 13.0 |
| E1 | WPM, No Biasing | 22.7 | 15.8 | 37.0 | 13.3 |
| E2 | Grapheme, Biasing | 14.8 | 12.5 | 24.2 | 8.7 |
| E3 | +subtactive cost | 8.1 | 10.0 | 13.2 | 5.8 |
| E4 | +WPM | 6.2 | 8.3 | 10.0 | 3.6 |
| E5 | +early biasing | 5.3 | 7.5 | 7.3 | 2.7 |

As dynamic class biasing is always on, it is important to not degrade performance when a bias phrase is not present in an utterance. Table 2 shows anti-context results. E1 is the baseline no-biasing WPM. Biasing this model (E5) gives a large degradation in performance on VS and IME. As discussed in Section 2.3.3, conventional models address this issue by including a prefix in the biasing FST. If a prefix is used without a weight to ignore the prefix, and the context is biased (E6), results on VS and IME improve, but quality degrades on the biasing sets. However, in E7, including a path with an empty prefix causes overbias, resulting in a degradation in VS and IME. Similar to server, the solution is to use a smaller weight on the context phrase if preceded by an empty prefix (E7). With this approach, very little degradation in VS and IME is observed, and also performance improves on the biasing test sets (E8).

TABLE 2

Anti-Context Results

| Exp ID | Model | VS | IME | Songs | Contacts-Real | Contacts-TTS | Apps |
|---|---|---|---|---|---|---|---|
| E1 | WPM, No Biasing | 6.9 | 4.0 | 22.7 | 15.8 | 37.0 | 13.3 |
| E5 | +Biasing, no prefix | 12.5 | 6.4 | 5.3 | 7.5 | 7.3 | 2.7 |
| E6 | +non-empty prefix | 7.0 | 4.0 | 10.1 | 6.9 | 7.6 | 2.7 |
| E7 | +empty prefix | 12.5 | 6.4 | 5.3 | 7.9 | 7.4 | 2.4 |
| E8 | +empty prefix, lower weight | 7.3 | 4.1 | 5.3 | 6.7 | 6.8 | 2.4 |

Moreover, Table 3 shows biasing numbers can be improved by improving knowledge of proper nouns. The baseline here is E8, the RNN-T WPM trained on 35 million supervised VS utterances. Experiment E9 shows improvements across all biasing test sets when training with unsupervised data. Training with TTS data (E10) gives in a larger improvements on the TTS test sets compared to unsupervised data (E9), but results to in a larger degradation on a real test set (Contacts-Real). This indicates that the improvements in TTS biasing sets are primarily coming from matched audio conditions between training and test data, rather than learning a richer vocabulary of proper nouns. Finally, fuzzing transcripts (E11) shows a quality degradation on all sets. Analysis going forward is based on E9 (unsupervised data).

TABLE 3

Proper Noun Results

| Exp ID | Model | Songs | Contacts-Real | Contacts-TTS | Apps |
|---|---|---|---|---|---|
| E8 | Sup Data | 22.7 | 15.8 | 37.0 | 13.3 |
|    | +Biasing | 5.3 | 6.7 | 6.8 | 2.4 |
| E9 | Sup + Unsup Data | 14.7 | 15.4 | 25.0 | 9.6 |
|    | +Biasing | 4.8 | 5.4 | 5.2 | 2.0 |
| E10 | TTS + Biasing | 4.3 | 7.1 | 1.8 | 1.0 |
| E11 | Fuzzing + Biasing | 7.2 | 11.0 | 14.0 | 4.4 |

Table 4 shows the bias phrase error rate (ERR), and the percentage of errors made in OOVs in the bias phrases, given the total number of OOVs in these phrases. (OOV). First, the table indicates across all test sets, unsupervised data largely improves the ERR metric, independent of biasing. In addition, because the unsupervised data model has seen more words in training, the ERR metric with biasing is better. Second, without biasing, the OOV metric is over 95%, showing that if the word is an OOV it almost certainly is not detected. However, when training with unsupervised data, biasing improves the errors in OOVs significantly over just training on supervised data. Both metrics indicate that unsupervised data helps the model to see more proper nouns and gives the model more confidence to bring the correct words to the beam.

TABLE 4

Error rate in biasing phrases, and errors due to OOV.

| Model | Songs | | Contacts-Real | | Contacts-TTS | | Apps | |
|---|---|---|---|---|---|---|---|---|
|  | Err | OOV | Err | OOV | Err | OOV | Err | OOV |
| E8 | 21.1 | 94.7 | 23.0 | 91.9 | 62.9 | 99.0 | 16.2 | 97.9 |
| +Bias | 4.5 | 64.2 | 8.0 | 29.4 | 7.0 | 24.4 | 2.0 | 26.1 |
| E9 | 15.5 | 90.8 | 22.3 | 94.6 | 55.6 | 100.0 | 12.1 | 100 |
| +Bias | 3.8 | 60.2 | 5.6 | 19.0 | 4.6 | 20.8 | 1.8 | 15.4 |

Table 5 compares the biasing performance of RNN-T to a conventional model of comparable size (130 MB), consisting of a CTC AM trained with context-independent phoneme targets, along with a separate PM and LM. The RNN-T model outperforms the embedded conventional model by 20%-40% relative on all categories except songs, perhaps due to the higher OOV rate in Table 1 compared to other categories.

TABLE 5

End-to-end vs. Conventional Model Biasing

| Model | VS | IME | Songs | Contacts-Real | Contacts-TTS | Apps |
|---|---|---|---|---|---|---|
| RNN-T | 6.7 | 3.9 | 4.8 | 5.4 | 5.2 | 2.0 |
| Conventional | 9.3 | 5.3 | 2.4 | 6.8 | 5.7 | 2.4 |

End-to-end (end-to-end) models are a promising research direction in speech recognition, as the single all-neural end-to-end system offers a much simpler and more compact solution compared to a conventional model, which has a separate acoustic (AM), pronunciation (PM) and language model (LM). However, it has been noted that end-to-end models sometimes perform poorly on tail words (e.g., uncommon words on the "long tail" of a word usage distribution) and proper nouns, likely because the end-to-end optimization requires joint audio-text pairs, and does not take advantage of additional lexicons and large amounts of text-only data used to train the LMs in conventional models. There have been numerous efforts in training a recurrent neural network language model (RNN-LM) on text only data and fusing it into the end-to-end model. In this discussion, this approach to training the end-to-end model is contrasted with audio-text pairs generated from unsupervised speech data. To target the proper noun issue specifically, a Part-of-Speech (POS) tagger filters the unsupervised data to use only those with proper nouns. Training with filtered unsupervised-data provides up to a 13% relative reduction in word-error-rate (WER), and when used in conjunction with a cold-fusion RNN-LM, up to a 17% relative improvement.

End-to-end models provide a simple yet effective way for automatic speech recognition (ASR). Traditionally, an ASR system consists of an AM, PM and LM, while end-to-end models fold these three components into a single neural network that is jointly optimized. Listen, Attend and Spell (LAS) is one such end-to-end model that has shown promising results compared to a strong conventional ASR system. However, while the LM in a conventional system can be independently trained on a large amount of text-only data, training an LAS model requires audio-text pairs, which are much more expensive to collect and much smaller in scale. Thus, LAS performs poorly compared to conventional models in recognizing rare words or phrases, such as song names, contacts, etc. There have been many efforts to improve end-to-end model performance using unpaired text data. One popular research direction looks to integrate an external LM, trained on the text-only data, with an end-to-end model. For example, the end-to-end model can be initialized with a pre-trained LM from text-only data and then jointly optimized with the LM through mutli-task training. In addition, interpolating independently trained end-to-end and LM models via shallow fusion has been explored, both for neural machine translation and ASR. Furthermore, integrating an RNN-LM trained on text-only data jointly into the end-to-end decoder has been explored, via both cold and deep fusion. Overall, leveraging text-only data has shown between 3% to 7% relative improvement in WER for ASR. Back translation has been explored to improve machine translation with monolingual training data. This improved the BLEU score by 2.8-3.7. This idea has also been applied to speech recognition, where synthetic audio generated from unpaired text data was used to expand the audio-text pairs for training end-to-end models. While the use of TTS data gives dramatic improvements on TTS test sets, degradation has been observed on real test sets.

In addition, conventional ASR systems make use of unlabeled audio data to improve performance. Confidence scores from an existing ASR system is commonly used to select unsupervised data for training with more data. For example, unsupervised speech data can be selected using a combination of the recognition word confidence score and the MLP posteriogram-based phoneme occurrence confidence for low resource languages. For the video speech caption task, an "island of confidence" approach was developed to largely increase the amount of training data to improve WER performance.

Training an all-neural end-to-end system such as LAS requires audio-text pairs to learn jointly an AM, PM and LM. While this joint training allows for potentially better optimization it also restricts to the use of paired audio-text data, resulting in end-to-end model performing poorly on rare words and proper nouns. In this work, techniques utilize untranscribed speech data to improve the performance of end-to-end models on these tail words.

Another way to address possible mismatches in unsupervised audio-text pairs is to generate synthetic audio from the text hypotheses using a single-speaker TTS engine with parallel WaveNet vocoder. This is similar to the "backtranslation" approach used in machine translation. One potential problem with this approach is the acoustic differences between real speech and synthetic audio, particularly the limited speaker characteristics and clean speaking style.

To address this concern, backpropping the encoder and decoder of the LAS model is compared to backpropping just the decoder. The encoder represents an AM and should be trained on realistic conditions. However, the decoder is akin to the LM and can be trained with less realistic conditions. Therefore, backpropping the decoder only could perhaps address the unrealistic audio concerns with TTS data.

More than a billion unsupervised utterances are available. This comes with an advantage that with more unsupervised data, the model sees a much larger vocabulary during training. However, more data comes at a cost of longer model training time.

Therefore, a subset of data is selected to train the LAS model. Specifically, because the model does poorly on proper nouns, filtering the unsupervised data to include these utterances may produce quality improvements with unsupervised data, with smaller training time compared to using all of the data. The decision whether an utterance contains proper nouns is made by running a Part-of-Speech (POS) tagger on the text hypothesis. The experiments are conducted on a human transcribed supervised training set and an unlabelled unsupervised training set. The supervised training set consisting of 35 million English utterances (~27,500 hours). These utterances are anonymized and hand transcribed, and are representative of internet voice search and dictation traffic. These utterances are further artificially corrupted using a room simulator, adding varying degrees of noise and reverberation such that the overall SNR is between 0 dB and 30 dB, with an average SNR of 12 dB. The noise sources are from internet videos and daily life noisy environmental recordings. For each utterance, 25 different noisy versions are generated for training.

The experiments use 80-dimensional log-Mel features, computed with a 25 ms window and shifted every 10 ms. At each current frame, these features are stacked with 3 consecutive frames to the left and then down-sampled to a 30 ms frame rate. The experiments are conducted with the LAS model. Specifically, the encoder network consists of 10 unidirectional long short-term memory (LSTM) layers, with each layer having 2,048 hidden units followed by a 384 dimensional projection layer. After the second layer of the encoder network, each frame is concatenated with its adjacent left neighboring frame and strided by 2 before passing them to the following layers. This stacking layer further reduces the frame rate to 60 ms. Layer normalization is adopted for encoder layers to stabilize the training. Additive attention with 4 attention heads are used. The decoder network consists of 4 unidirectional LSTM layers with 2,048 hidden units and output projection size of 384. The output of the LAS model is a vocabulary of 16K word pieces.

The models are trained with label smoothing and cross-entropy loss using TensorFlow. The experiments use 8×8 Tensor Processing Units (TPU) slices with global batch size of 4,096 and train the models for ~200,000 steps.

The performance of the LAS model trained with only the supervised training data (denoted as 130) is presented in Table 6. The performance of the full stack conventional model used as the teacher model for weak distillation is also presented. The teacher model is a conventional context-dependent phoneme based low frame rate acoustic model, a 4 million word pronunciation lexicon and a 5-gram language model. This model is referred to as B1. The teacher model is trained using the same supervised training data. The table shows that the LAS model outperforms the conventional model on most of the test sets. However, the conventional model uses context information in practice to prune the search space, which helps reduce WER on sets with many proper nouns (songs, contacts, apps). The performance of the teacher model with context biasing is denoted as B2 in Table 6.

To distill the knowledge encoded in the recognized hypotheses, B0 trains on the one billion unsupervised data. The hypotheses generated by B2 are used as the reference transcripts, regardless of the errors in those transcripts. Training on one billion unsupervised data for 450K steps (E0), good improvements are obtained on all of the TTS sets, but degradation is observed for the Voice Search and Contacts-Real. The wins on TTS sets mainly come from the more word variations brought by the data, but the loss is most likely due to the errors in decoded hypotheses. To reduce the degradation on Voice Search and Contacts-Real, E0 is further fine-tuned with the supervised data for 150K steps (E1). It improves over B0 on all the test sets.

TABLE 6

WER performance (%) of baseline experiments.

| Exp | VS | Apps | Songs | Contacts TTS | Contacts Real |
|-----|-----|------|-------|------|------|
| B0 | 5.4 | 9.2 | 13.5 | 24.8 | 15.0 |
| B1 | 6.8 | 9.0 | 13.1 | 26.0 | 16.8 |
| B2 | — | — | 2.2 | 3.7 | 6.3 |

Training with one billion data takes a long time. To understand whether this amount of data is needed, the unsupervised data is randomly down-sampled to 500 million and 100 million, respectively. The model trains on the unsupervised data alone first (E2 and E4), and then fine-tunes on the supervised data (E3 and E5). Gains are achieved with both 100 million and 500 million unsupervised data across test sets, but using one billion data offers slightly better performance.

TABLE 7

WER performance (%) of two-stage training with unsupervised data

| Exp | uns Data | VS | Apps | Songs | Contacts TTS | Contacts Real |
|-----|------|-----|------|-------|------|------|
| B0 | 0 | 5.4 | 9.2 | 13.5 | 24.8 | 15.0 |
| E0 | 1B | 6.7 | 9.2 | 12.9 | 23.3 | 18.5 |
| E1 | | 5.0 | 8.9 | 12.9 | 23.9 | 14.5 |
| E2 | 500M | 6.8 | 9.5 | 13.3 | 23.6 | 19.4 |
| E3 | | 5.2 | 8.8 | 12.3 | 24.0 | 15.1 |
| E4 | 100M | 6.7 | 9.6 | 13.6 | 24.6 | 16.9 |
| E5 | | 5.2 | 8.7 | 12.9 | 24.1 | 14.7 |

Experiments in Table 7 showed that after training the LAS model with unsupervised data, the model needs to be fined-tuned with supervised data again. To simplify the training procedure, the supervised and unsupervised data are mixed together during training. Specifically, whenever creating a batch of utterances for training, random selection occurs from the two training sets with a fixed ratio. For example, with the mixing ratio of 8:2, a training batch comes from the supervised data 80% of the time and from unsupervised data 20% of the time.

From the results in Table 8, mixing the supervised and unsupervised data is an effective way of utilizing the unsupervised data. Among the three different ratios, 8:2 gives the best performance across board with marginal differences. When comparing E8 to E1, much lower WERs are achieved on test sets with more proper nouns (Apps, Songs, Contacts) although the gain on Voice Search is smaller compared to E1.

In this section, different approaches of incorporating the unsupervised data are compared. All experiments use a randomly sampled 100 million subset of the unsupervised data, for fast experiment turn-around. E9 is trained exactly the same way as E8 but with less unsupervised data.

TABLE 8

WER performance (%) of mixed training with unsupervised data. "Ratio" corresponds to the percentage of using supervised vs. unsupervised data.

| Exp | Ratio | VS | Apps | Songs | Contacts TTS | Contacts Real |
|-----|-------|-----|------|-------|------|------|
| B0 | — | 5.4 | 9.2 | 13.5 | 24.8 | 15.0 |
| E1 | — | 5.0 | 8.9 | 12.9 | 23.9 | 14.5 |
| E6 | 6:4 | 5.4 | 8.0 | 11.5 | 22.9 | 13.7 |
| E7 | 7:3 | 5.3 | 7.8 | 11.3 | 22.9 | 13.7 |
| E8 | 8:2 | 5.3 | 7.8 | 11.3 | 22.8 | 13.7 |

TABLE 9

WER performance (%) of using audio-only data vs. text-only data

| Exp | Info | VS | Apps | Songs | Contacts TTS | Contacts Real |
|-----|------|-----|------|-------|------|------|
| B0 | — | 5.4 | 9.2 | 13.5 | 24.8 | 15.0 |
| E9 | 8:2(100M) | 5.2 | 8.2 | 11.9 | 23.6 | 13.8 |
| E10 | TTS(enc + dec) | 5.2 | 3.1 | 5.2 | 14.2 | 14.5 |
| E11 | TTS(dec) | 5.3 | 3.3 | 5.2 | 14.2 | 14.7 |
| E12 | LM fusion | 5.1 | 9.0 | 12.7 | 24.1 | 14.7 |

The results in Table 9 show that less unsupervised data produces slightly better performance on the generic Voice Search test set but higher WERs on test sets with more tail words. Next, audio is synthesized from the unsupervised transcripts, where the aforementioned TTS system is used to create the rare word test sets. The unsupervised data used in E9 is replaced with this TTS training set and the results are presented in Table 9 as E10. It achieves a large WER reduction for all the TTS test sets but degrades the performance on Contacts-Real. This huge error reduction on TTS sets mainly comes from the matched acoustics between the added unsupervised data and the test sets. To avoid the potential mismatched audio conditions between real and synthetic data, the update of the encoder network parameters is disabled, and only the decoder network of the LAS model is updated during training. The results (E11) are similar to E10 with slightly degradation on Apps. Despite the large error reductions on TTS sets, the degradation on more realistic test sets compared to E9 tells the real story. Hence, E9 is preferred over E10 and E11.

Another way of utilizing the unsupervised data is to integrate an LM into the LAS system. Specifically, an RNN-LM is trained on the supervised and 100 million unsupervised data transcripts, and then integrated into the LAS model training using cold fusion. The result (E12) shows 2%-6% relative WER reduction over the supervised baseline (B0), but the gain is much smaller compared to E9.

This section explores how to better utilize the unsupervised data. First, instead of random selection (E9) of 100 million unsupervised utterances, the unsupervised data is filtered to use only those with proper nouns (E13 in Table 10) for training, as that allows selection of utterances where the LAS model does poorly. The selection is done with a proper noun tagger. The 100 million unsupervised data focusing on proper nouns is mixed with the supervised training data at the same 8:2 ratio for training. With the same amount of data, training with the proper noun filtered speech gives 6%-13% relative WER reduction compared to the 4%-12% relative reduction using random selection.

TABLE 10

WER performance (%) of using proper
noun filtered unsupervised data

| Exp | Info | VS | Apps | Songs | Contacts TTS | Contacts Real |
|---|---|---|---|---|---|---|
| B0 | — | 5.4 | 9.2 | 13.5 | 24.8 | 15.0 |
| E8 | 1B random | 5.3 | 7.8 | 11.3 | 22.8 | 13.7 |
| E9 | 100M random | 5.2 | 8.2 | 11.9 | 23.6 | 13.8 |
| E13 | 100M filtered | 5.1 | 8.0 | 12.0 | 22.8 | 13.6 |
| E14 | 500M filtered, fusion | 5.0 | 7.7 | 11.2 | 21.9 | 13.2 |

Finally, the filtering idea is extended to the entire one billion unsupervised training data, which leaves around 500 million utterances with proper nouns. The weak distillation using the filtered data with is combined with cold fusion. The final results (E14 in Table 10) are much better than using all the one billion data and it reduces the WER of the baseline system on all the four test sets by 6%-17%, relatively.

To understand the improvements brought by the unsupervised data, the two systems B0 and E14 are compared in this section. B0 uses only the supervised training data, while E14 uses additional unsupervised training data. The out-of-vocabulary ("OOV") rate computed as the fraction of unique words appearing in the test set but not in the corresponding training set is presented in Table 11. With unsupervised data, the OOV rates on the proper noun sets drops by up to 84.0%. This suggests the unsupervised data indeed brings in more tail words.

TABLE 11

WER (%) and OOV rate (%) comparisons between the baseline
model ("B0") trained with only the supervised data
and the best system ("E14") trained with 8:2 mixing
ratio of the supervised data and 500 million proper noun
filtered unsupervised data. "Rel." shows the relative improvements.

| | WER | | | OOV Rate | | |
|---|---|---|---|---|---|---|
| Test Set | B0 | E14 | Rel. | B0 | E14 | Rel. |
| VS | 5.4 | 5.0 | 7.4 | 2.3 | 2.1 | 8.7 |
| Apps | 9.2 | 7.7 | 16.3 | 0.6 | 0.1 | 83.3 |
| Songs | 13.5 | 11.2 | 17.0 | 0.9 | 0.6 | 33.3 |
| Contacts-TTS | 24.8 | 21.9 | 11.7 | 2.5 | 0.4 | 84.0 |
| Contacts-Real | 15.0 | 13.2 | 12.0 | 1.9 | 0.7 | 63.2 |

The use of unsupervised speech data to improve the performance of the LAS model on long tail words was investigated. A conventional ASR system with contextual biasing was used as the teacher model to generate text hypotheses as transcript truth for a large amount of unsupervised data. These machine labeled data were mixed with human-labeled data to train an end-to-end LAS model. To focus on LAS model's weakness on rare words, proper-noun-based filtering was applied for the unsupervised data. With the filtered data, experimental results have shown that up to 17% relative WER reduction could be achieved by introducing unsupervised data For example, the occurrence of the prefix "call" can indicate that a contact name is likely the next word, and so the prefix FST 163 for this prefix can cause the speech recognizer 100 to enable the contact names contextual FST 160.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 5:
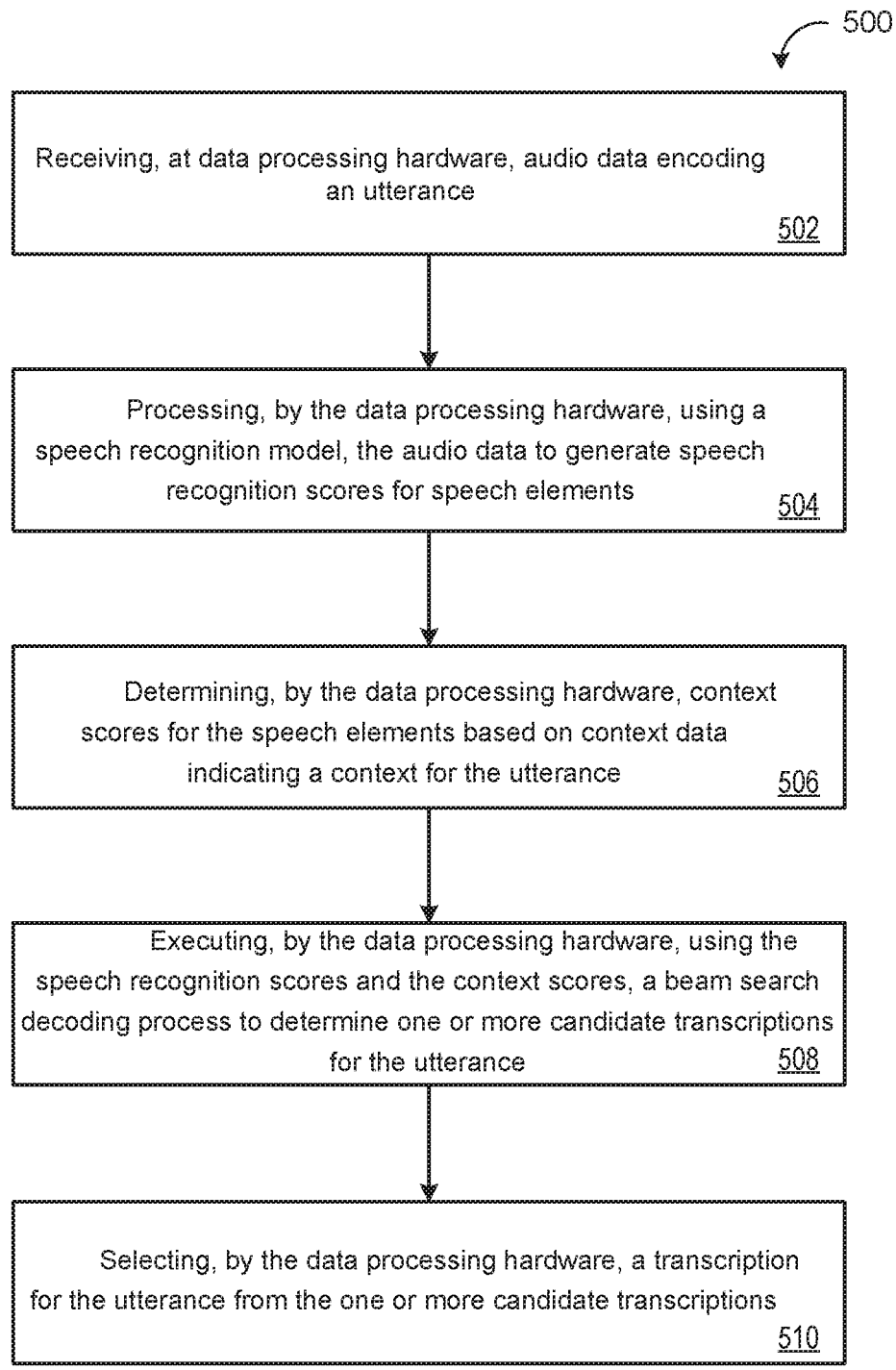
FIG. 5 is a flowchart of an example arrangement of operations for a method of using contextual biasing to transcribe speech.

FIG. 5 is a flowchart of an example arrangement of operations for a method 500 of using contextual biasing to transcribe speech. At operation 502, the method 500 includes receiving, at data processing hardware 610 (FIG. 6), audio data 125 encoding an utterance 120. In some examples, the data processing hardware 610 resides on a user device 110. In other implementations, the data processing hardware 610 resides on a remote server 111 in communication with the user device 111. The user device 110 may include one or more microphones that capture the utterance 120 spoken by a user 115 and generate the audio data 125 encoding the utterance 120.

At operation 504, the method 500 includes processing, by the data processing hardware 610, using a speech recognition model 200, the audio data 125 to generate speech recognition scores 145 for speech elements. The speech recognition scores 145 may represent the likelihood that differing speech elements have occurred. Examples of speech elements may include wordpieces or graphemes. Because the speech recognition model 200 includes an end-to-end model combining the functionality of a pronunciation model, an acoustic model, and a language model in a single model (e.g., neural network), the speech recognition model 200 may receive acoustic features 135, or even raw audio data 125, and provide output scores indicating likelihoods of orthographic features (e.g., graphemes, wordpieces, or words) in response.

At operation 506, the method 500 also includes determining, by the data processing hardware 610, context scores 166 for the speech elements based on context data indicating a context 122 for the utterance 120. The speech recognizer 100 can include a context analysis module 165 that receives various types of information about a context 122 of the utterance 120. For example, the context analysis module 165 may receive information about a location of the device 110, a task being performed by the user 115 using the device 110, an application that is open or active on the device 110, and so on. The context analysis module 165 can also receive data indicating the most recent speech recognition decisions, such as most recently recognized grapheme, wordpiece, word, or phrase, including in partial or preliminary transcriptions 186 during a beam search process. Though shown as occurring sequentially, the context analysis module 165 may calculate the context scores 166, while at the same time, the speech recognition model 200 evaluates the audio features 135 to calculate the speech recognition scores 145.

At operation 508, the method 500 also includes executing, by the data processing hardware 610, using the speech recognition scores 145 and the context scores 166, a beam search decoding process to determine one or more candidate transcriptions for the utterance 120. The beam search process may evaluate potential paths through a speech lattice 175 and determine the transcription 185. Each path through the lattice 175 can represent a different candidate transcription. Here, the context scores 166 bias the recognition toward terms that are more relevant for the particular user 115 in the current context than for speech recognition generally. In some implementations, a score combiner 170 combines the speech recognition scores 145 with the context scores 166 to produce combined scores 172 used in a speech lattice 175. Significantly, the biasing influence of the context scores 166 is applied to the speech lattice 175 before pruning of the lattice 175 and before beam pruning in beam search. As a result, due to the influence of the context scores 166, relevant terms that might otherwise have been pruned are maintained through the beam search process and related pruning.

At operation 510, the method 500 also includes selecting, by the data processing hardware 610, a transcription 185 for the utterance 120 from the one or more candidate transcriptions. Each path through the lattice 175 can represent a different candidate transcription. Beam pruning 180 can reduce the range of the lattice 175 that is searched for probable words or word pieces. As the probability of each wordpiece is calculated, unlikely search paths are pruned, until only the most probable path remains. Once the transcription 185 is determined, the transcription 185 can be used in any of various ways, e.g., displayed to the user 115, entered into a text field, sent as a query to a search engine or request to a digital conversational assistant, interpreted as a voice command, and so on.

Figure 6:
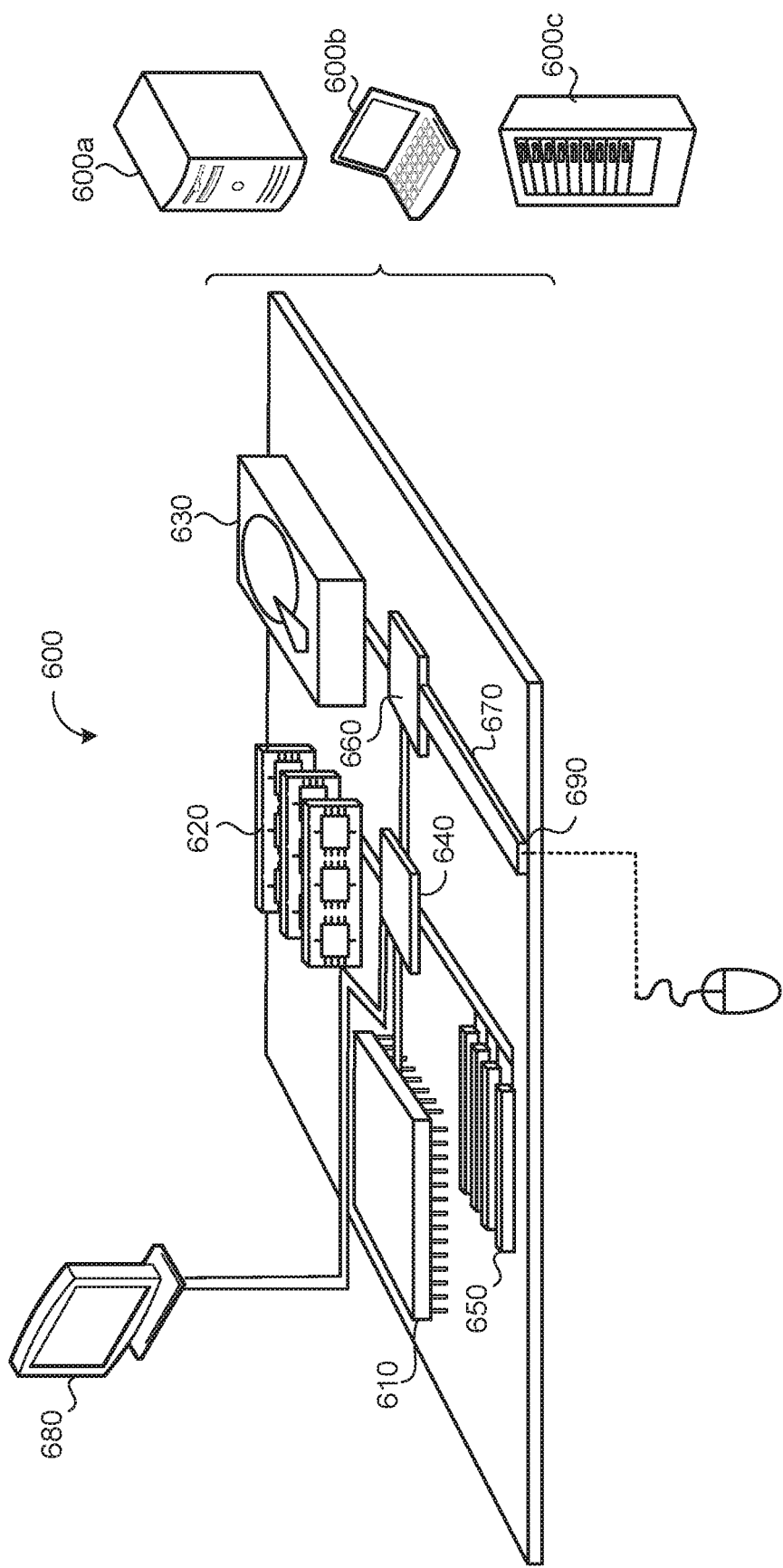
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The to processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   receiving, at data processing hardware, audio data encoding an utterance;
   processing, by the data processing hardware, using a speech recognition model, the audio data to generate speech recognition scores for speech elements;
   determining, by the data processing hardware, that a preliminary transcription for the utterance comprises a word that represents a prefix element, the prefix element indicating that a next element corresponds to a context for the utterance;
   selecting, by the data processing hardware, a first contextual finite-state transducer (FST) from a plurality of contextual FSTs based on a particular context corresponding to the first contextual FST matching the context for the utterance indicated by the word of the preliminary transcription determined to represent the prefix element of the utterance, wherein each contextual FST in the plurality of contextual FSTs corresponds to a respective different particular context for a same user that spoke the utterance;
   determining, by the data processing hardware, using the first contextual FST, context scores for the speech elements;
   executing, by the data processing hardware, using the speech recognition scores and the context scores, a beam search decoding process to determine one or more candidate transcriptions for the utterance; and
   selecting, by the data processing hardware, a transcription for the utterance from the one or more candidate transcriptions.

2. The method of claim 1, wherein, during execution of the beam search decoding process, the context scores are configured to adjust a likelihood of the one or more candidate transcriptions before pruning any of the one or more candidate transcriptions from evaluation.

3. The method of claim 1, wherein executing the beam search decoding process comprises using the context scores to prune paths through a speech recognition lattice to determine the one or more candidate transcriptions for the utterance.

4. The method of claim 1, further comprising, prior to receiving the audio data encoding the utterance:
   generating, by the data processing hardware, the plurality of contextual FSTs to each represent a different set of words or phrases in a personalized data collection of the same user that spoke the utterance; and
   storing, by the data processing hardware, the plurality of contextual FSTs in memory hardware in communication with the data processing hardware.

5. The method of claim 4, wherein the personalized data collection comprises a contacts list for the same user.

6. The method of claim 4, wherein the personalized data collection comprises a media library for the same user.

7. The method of claim 4, wherein the personalized data collection comprises a list of applications installed on a user device associated with the same user.

8. The method of claim 4, further comprising, for each of at least one contextual FST in the plurality of contextual FSTs:

generating, by the data processing hardware, a corresponding prefix FST comprising a set of one or more prefixes each corresponding to the respective different particular context of the corresponding contextual FST; and storing, by the data processing hardware, the corresponding prefix FST generated for the at least one contextual FST in the plurality of contextual FSTs.

9. The method of claim 1, wherein the data processing hardware:
resides on a user device associated with the same user that spoke the utterance; and
executes the speech recognition model.

10. The method of claim 1, wherein the speech recognition model comprises an end-to-end speech recognition model.

11. The method of claim 10, wherein the end-to-end speech recognition model comprises a recurrent neural network-transducer (RNN-T).

12. The method of claim 1, wherein the plurality of contextual FSTs represent contextual terms using elements representing subword units.

13. The method of claim 1, wherein the plurality of contextual FSTs comprise:
transition weights configured to bias transitions between subword units of a contextual term; and
backoff arcs having offsetting weights configured to undo the biasing effect of the transition weight.

14. The method of claim 1, wherein the speech elements comprise wordpieces or graphemes.

15. A system comprising:
data processing hardware; and
memory hardware in communication with the data processing hardware, the memory hardware storing instructions that when executed on the data processing hardware cause the data processing hardware to perform operations comprising:
receiving audio data encoding an utterance;
processing, using a speech recognition model, the audio data to generate speech recognition scores for speech elements;
determining that a preliminary transcription for the utterance comprises a word that represents a prefix element, the prefix element indicating that a next element corresponds to a context for the utterance;
selecting a first contextual finite-state transducer (FST) from a plurality of contextual FSTs based on a particular context corresponding to the first contextual FST matching the context for the utterance indicated by the word of the preliminary transcription determined to represent the prefix element of the utterance, wherein each contextual FST in the plurality of contextual FSTs corresponds to a respective different particular context for a same user that spoke the utterance;
determining, using the first FST, context scores for the speech elements;
executing, using the speech recognition scores and the context scores, a beam search decoding process to determine one or more candidate transcriptions for the utterance; and
selecting a transcription for the utterance from the one or more candidate transcriptions.

16. The system of claim 15, wherein, during execution of the beam search decoding process, the context scores are configured to adjust a likelihood of the one or more candidate transcriptions before pruning any of the one or more candidate transcriptions from evaluation.

17. The system of claim 15, wherein executing the beam search decoding process comprises using the context scores to prune paths through a speech recognition lattice to determine the one or more candidate transcriptions for the utterance.

18. The system of claim 15, wherein the operations further comprise, prior to receiving the audio data encoding the utterance:
generating the plurality of contextual FSTs to each represent a different set of words or phrases in a personalized data collection of the same user that spoke the utterance; and
storing the plurality of contextual FSTs in the memory hardware in communication with the data processing hardware.

19. The system of claim 18, wherein the personalized data collection comprises a contacts list for the same user.

20. The system of claim 18, wherein the personalized data collection comprises a media library for the same user.

21. The system of claim 18, wherein the personalized data collection comprises a list of applications installed on a user device associated with the same user.

22. The system of claim 18, wherein the operations further comprise, for each of at least one contextual FST in the plurality of contextual FSTs:
generating a corresponding prefix FST comprising a set of one or more prefixes each corresponding to the respective different particular context of the corresponding contextual FST; and
storing the corresponding prefix FST generated for the at least one contextual FST in the plurality of contextual FSTs.

23. The system of claim 15, wherein the data processing hardware:
resides on a user device associated with the same user that spoke the utterance; and
executes the speech recognition model.

24. The system of claim 15, wherein the speech recognition model comprises an end-to-end speech recognition model.

25. The system of claim 24, wherein the end-to-end speech recognition model comprises a recurrent neural network-transducer (RNN-T).

26. The system of claim 15, wherein the plurality of contextual FSTs represent contextual terms using elements representing subword units.

27. The system of claim 26, wherein the plurality of contextual FSTs comprise:
transition weights configured to bias transitions between subword units of a contextual term; and
backoff arcs having offsetting weights configured to undo the biasing effect of the transition weight.

28. The system of claim 15, wherein the speech elements comprise wordpieces or graphemes.

* * * * *